Figure 1:
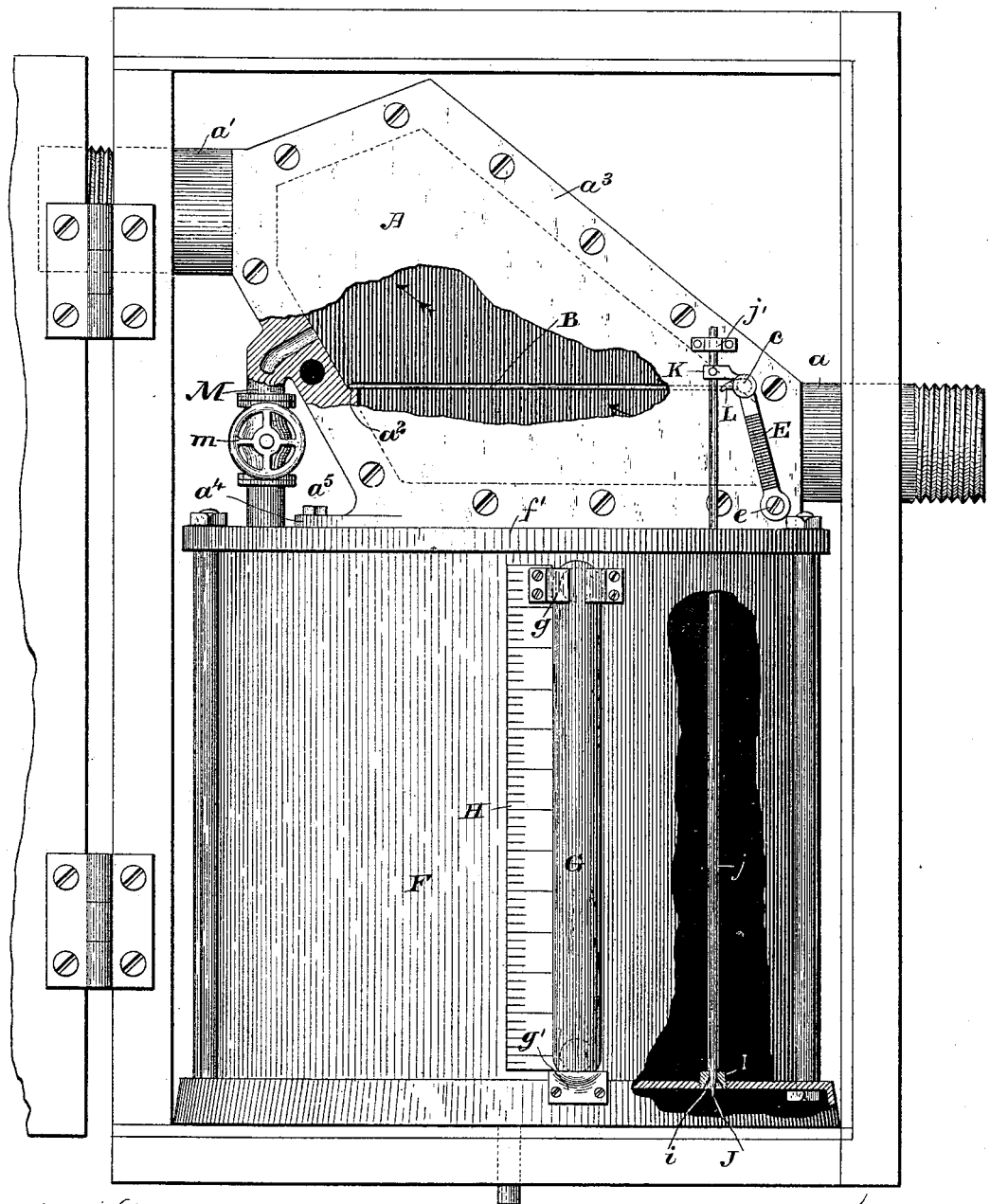

(No Model.)　　　　　　　　　　　　　　　　　3 Sheets—Sheet 1.
N. B. ACHESON.
PROPORTIONAL WATER METER.

No. 339,832.　　　　　　　　　　　Patented Apr. 13, 1886.

(No Model.)  3 Sheets—Sheet 2.
N. B. ACHESON.
PROPORTIONAL WATER METER.
No. 339,832.  Patented Apr. 13, 1886.
FIG. II.
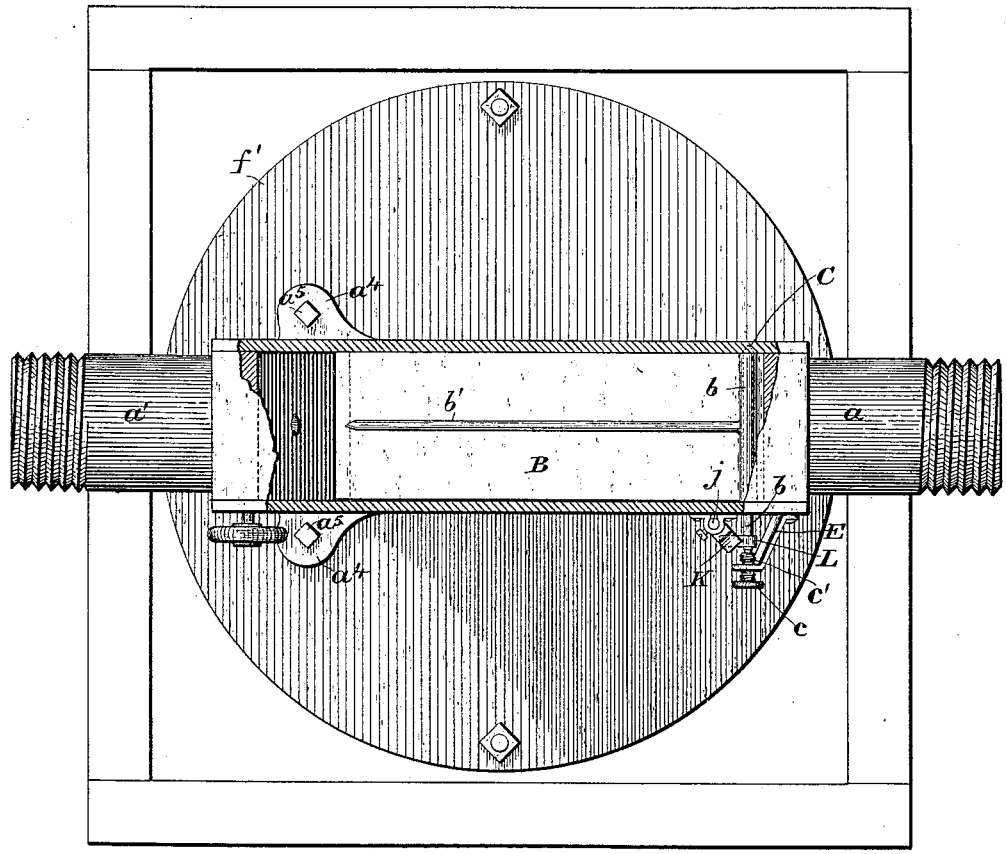
Attest:
Geo. T. Smallwood.
C. S. Belt.
Inventor:
Nathan B. Acheson
By Paine & Ladd,
attys (No Model.)  3 Sheets—Sheet 3.
N. B. ACHESON.
PROPORTIONAL WATER METER.
No. 339,832.  Patented Apr. 13, 1886.
FIG. III.
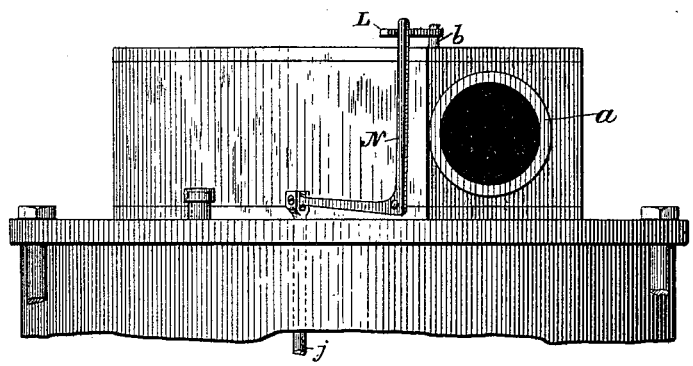
FIG. IV.
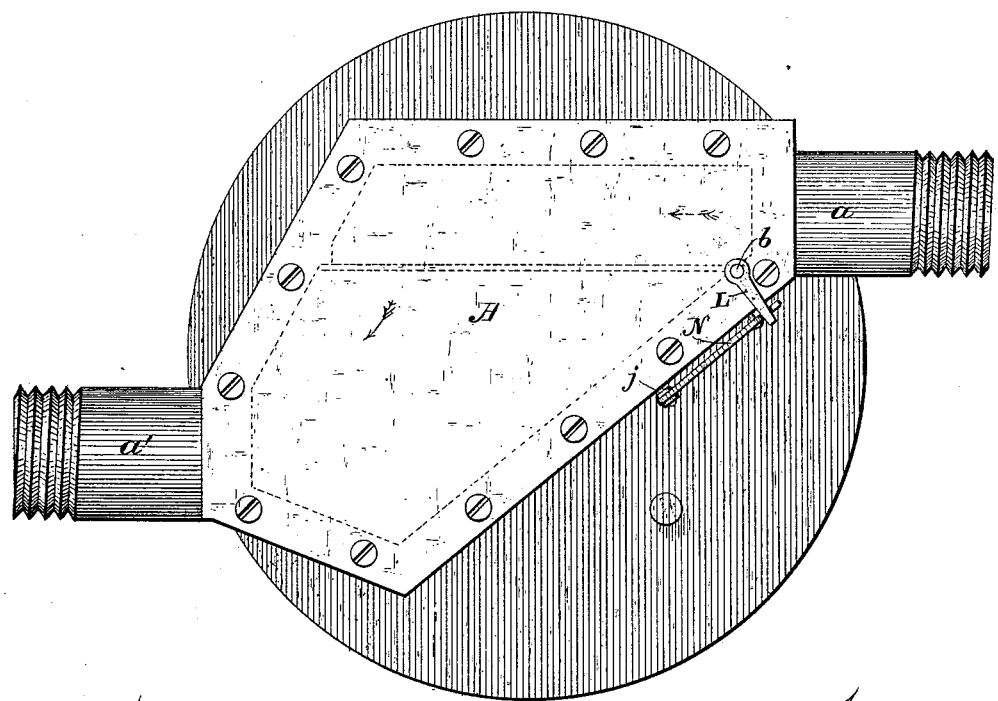
Attest:
Geo. T. Smallwood.
C. T. Beer.
Inventor:
Nathan B. Acheson
By Paine & Ladd,
Att'ys
N. PETERS, Photo-Lithographer, Washington, D. C.

UNITED STATES PATENT OFFICE.

NATHAN B. ACHESON, OF YOUNGSTOWN, OHIO, ASSIGNOR OF TWO-THIRDS TO JOHN M. WALTER, OF SAME PLACE, AND JAMES M. FERRIS, OF CLEVELAND, OHIO.

PROPORTIONAL WATER-METER.

SPECIFICATION forming part of Letters Patent No. 339,832, dated April 13, 1886.

Application filed November 27, 1885. Serial No. 184,088. (No model.)

*To all whom it may concern:*

Be it known that I, NATHAN B. ACHESON, a citizen of the United States, residing at Youngstown, in the county of Mahoning and State of Ohio, have invented certain new and useful Improvements in Fluid-Meters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to machines for measuring fluid bodies and indicating the quantity which has passed through the apparatus.

The invention consists in the combination of two vessels. One of these acts as a reservoir, and is provided with a valve through which the liquid contained in the reservoir may escape. The other vessel is also provided with a valve through which all the fluid to be measured passes, and the two valves are so connected together that the quantity of liquid which escapes from the reservoir is directly proportional to the quantity of fluid which passes through the apparatus, the escape of the contents of one being regulated by the passage of the fluid through the other.

This invention further consists in the detailed construction and combination of the parts hereinafter fully described and claimed.

In the drawings, Figure I is a side view of the apparatus, with portions of the vessels shown broken away, so as to expose the interior mechanism. Fig. II is a plan view of the same, with a portion of the upper vessel shown broken away for the same purpose. Fig. III is a side view of a modification of the device. Fig. IV is a plan view of the same.

A is a vessel or apartment or section of pipe through which all the fluid to be measured is obliged to pass, and for this purpose the said vessel is provided with an inlet-pipe, $a$, and with an outlet-pipe, $a'$.

B is a valve, provided at one end with the valve-spindle $b$. This valve when closed rests upon a valve-seat, $a^2$, on the inside walls of the vessel A, between the inlet and outlet pipes, so that any fluid passing through the apparatus must raise the said valve in its passage. One end of the valve-spindle $b$ is supported within the vessel A by the anti-friction center pivot, C. The other end of the said spindle passes through the side of the vessel and is supported at its lower extremity by the anti-friction center pivot, C'. The pivot C' is screw-threaded on the outside and provided with the milled head $c$, so that the wear of the ends of the spindle may be taken up whenever occasion requires.

E is a bracket secured to the side of the vessel A by the screw $e$, for carrying the screw-threaded pivot C'.

The valve B is further provided with the rib $b'$ upon the back of it, to keep it from sagging or springing.

The vessel A is provided with a cover, $a^3$, secured by screws, so that ready access may be had to the interior whenever occasion requires.

$a^4$ are flanges through which the bolts $a^5$ pass and secure the said vessel to the reservoir-cover.

F is a vessel, which constitutes a reservoir and which contains a certain known quantity of liquid. This reservoir is provided with a cover, $f'$, fastened on by bolts.

G is a gage-glass provided with connections $g$ and $g'$ at top and bottom, of ordinary construction, for connecting it to the reservoir.

H is a graduated scale for indicating the height of the liquid in the said gage-glass and reservoir. In the bottom of the reservoir there is a valve-seat, I, having a small valve-opening, $i$.

J is a valve, preferably of tapering form, which regulates the flow of the liquid which is allowed to escape from the reservoir; and $j$ is the valve-stem, which may be formed integral with the said valve or be otherwise securely connected to it. This valve-stem passes upward through the cover $f'$, and is supported at its upper end in the guide $j'$, secured upon the side of vessel A. A small lug, K, is adjustably secured to the valve-spindle $j$.

L is a cam, which is carried by the projecting end of the valve-spindle $b$, and it operates in connection with the lug K.

The operation of the apparatus is as follows: When no fluid is passing through the vessel A, the valves B and J are both closed, and no liquid escapes from the reservoir. When any fluid passes through the vessel A, the valve B is raised to a certain extent and held open for the passage of the said fluid for a certain space of time. This opening of valve B operates the valve J, and a certain quantity of the liquid—water being ordinarily used—is allowed to escape from the reservoir. To secure accurate work, the valve J is so proportioned that the quantity of fluid passing through it at any moment is always directly proportional to the quantity of fluid passing through the valve B at the same moment, and the valves are held open through the same spaces of time. It consequently follows that the quantity of water which escapes from the reservoir in a given time will be directly proportional to the quantity of fluid which has passed through the vessel A in the same space of time, and this quantity will be indicated on the scale H by the level of the fluid in the gage-glass.

Meters constructed according to this invention may be used for water, steam, gas, and other fluids, and water, oil, quicksilver, or other liquids may be used in the reservoir; or very fine sand, as is used in hour-glasses, may be employed.

When used as a water-meter, water is preferably used in the reservoir, and the latter may very conveniently be replenished from the vessel A. For this purpose the pipe M is provided and furnished with a stop-cock, $m$, for common use in filling the reservoir whenever required. The small quantity of water thus abstracted is not sufficient to materially injure the record.

When the meter is used for gas, which has but little pressure, it is preferable to arrange the vessel A upon its side on the top of the reservoir, as shown in Figs. 3 and 4. This will place the valve-plate B in a vertical plane, and the gas will not have to exert so much force to move it. The valve-stem $j$ is then connected to the cam L by the lever N, pivoted to the vessel A, and the lug K is secured to the end of the arm next to the said cam, so that the desired movement may be imparted to the valve J.

The whole apparatus can be inclosed in a box, and locked up so that it cannot be tampered with.

Having thus described my invention, what I claim as new, and desire to secure by Letters Patent, is—

1. In a meter, the combination of a vessel containing a valve-operating device which is actuated by the passage of the fluid through the vessel with a reservoir separate from said vessel and containing a liquid, and having a valve operated by the said valve-operating device in the vessel, whereby the quantity of fluid which passes through the vessel is proportionately measured by the quantity of liquid which escapes from the reservoir, substantially as set forth.

2. In a meter, the combination of a vessel provided with inlet and outlet pipes, a valve contained within the said vessel between the said pipes, a reservoir separate from said vessel and containing a liquid, and a valve operated by the said valve in the vessel, so that the quantity of fluid which escapes from the said reservoir is proportionate to that which passes through the said vessel, substantially as set forth.

3. In a meter, the combination of a vessel provided with inlet and outlet pipes, a valve contained within the said vessel between the said pipes, a reservoir containing liquid, a gage for indicating the quantity of liquid in the reservoir, and a valve operated by the said valve in the vessel, so that the quantity of liquid which escapes from the said reservoir is proportionate to that which passes through the said vessel, substantially as set forth.

4. In a meter, the combination of a vessel provided with inlet and outlet pipes, a valve contained within the said vessel between the said pipes, a reservoir containing a liquid, a replenishing-pipe provided with a stop-cock connecting the said vessel and reservoir, and a valve operated by the said valve in the vessel, so that the quantity of liquid which escapes from the said reservoir is proportional to that which passes through the said vessel, substantially as and for the purpose set forth.

5. The combination of a vessel provided with inlet and outlet pipes and a valve-seat between the said pipes, a valve contained within the said vessel and resting on the said valve-seat, a reservoir containing a liquid, the valve J, provided with a spindle, $j$, and lug K, for regulating the escape of the liquid from the said reservoir, and mechanism connecting the said valve in the vessel with the valve J, substantially as and for the purpose set forth.

6. The combination of a vessel provided with inlet and outlet pipes and a valve seat between the said pipes, the valve B, having the valve-spindle $b$ pivoted within the said vessel, center pivots for supporting the said valve-spindle, a cam secured on the said valve-spindle, a reservoir containing a liquid, the valve J, provided with the spindle $j$, and the lug K, secured upon the valve-spindle $j$, substantially as and for the purpose set forth.

7. The combination of a vessel provided with inlet and outlet pipes and the valve-seat $a^2$, the valve B, having valve-spindle $b$, the center pivot, C, the adjustable center pivot, C', supported by a bracket, the cam L, a reservoir containing a liquid, the valve J, having spindle $j$, and the lug K, substantially as and for the purpose set forth.

8. The combination, in a meter, of a valve controlled by the flow of the fluid to be measured through the meter, a reservoir the pressure in which is independent of the pressure of the fluid to be measured, and a valve regulating the discharge of the contents of the reservoir, which valve is govered by the first-named valve, substantially as and for the purpose set forth.

In testimony whereof I affix my signature in presence of two witnesses.

NATHAN B. ACHESON.

Witnesses:
M. C. McNABB,
J. M. WALTER.